(12) United States Patent
Brune et al.

(10) Patent No.: US 8,037,222 B2
(45) Date of Patent: Oct. 11, 2011

(54) METHOD FOR THE DATA EXCHANGE BETWEEN NETWORK DEVICES

(75) Inventors: Thomas Brune, Hannover (DE); Ingo Hütter, Pattensen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1585 days.

(21) Appl. No.: 10/399,272

(22) PCT Filed: Oct. 11, 2001

(86) PCT No.: PCT/EP01/11747
§ 371 (c)(1),
(2), (4) Date: Apr. 16, 2003

(87) PCT Pub. No.: WO02/35770
PCT Pub. Date: May 2, 2002

(65) Prior Publication Data
US 2004/0044421 A1 Mar. 4, 2004

(30) Foreign Application Priority Data
Oct. 20, 2000 (EP) .................................... 00122864

(51) Int. Cl.
*G06F 13/12* (2006.01)
*G05B 11/01* (2006.01)
(52) U.S. Cl. .......................................... 710/62; 715/700
(58) Field of Classification Search .................. 345/700, 345/716, 733, 744–750, 760; 709/203; 710/8, 710/62, 63, 72, 73
See application file for complete search history.

(56) References Cited

U.S. PATENT DOCUMENTS

| | | | |
|---|---|---|---|
| 5,968,030 A | 10/1999 | Shimizu et al. | |
| 6,253,114 B1 * | 6/2001 | Takihara | 700/83 |
| 6,434,447 B1 * | 8/2002 | Shteyn | 700/245 |
| 6,700,592 B1 * | 3/2004 | Kou et al. | 715/771 |
| 6,801,507 B1 * | 10/2004 | Humpleman et al. | 370/257 |
| 2001/0038392 A1 * | 11/2001 | Humpleman et al. | 345/733 |
| 2002/0078259 A1 * | 6/2002 | Wendorf et al. | 709/328 |
| 2002/0152311 A1 * | 10/2002 | Veltman et al. | 709/227 |

FOREIGN PATENT DOCUMENTS

| | | |
|---|---|---|
| EP | 535749 | 4/1993 |
| JP | 7-44477 | 2/1995 |
| JP | 10-24066 | 1/1998 |
| WO | 00/26794 | 5/2000 |

* cited by examiner

*Primary Examiner* — Ilwoo Park
(74) *Attorney, Agent, or Firm* — Robert D. Shedd; Paul P. Kiel

(57) ABSTRACT

Two or more electronic devices are connected via a bus system building a cluster or chain of devices. A device can be selected using a control device, wherein an user interface for the selected device is generated based on description data which are stored in the selected device and are transferred to the control device. A single user interface is shown on a display of the control device which allows to operate at least two devices simultaneously. The user interface of a first device is displayed as main user interface and the user interface of a second device is rendered within the main interface as reduced user interface which includes only operation elements necessary for operation of the second device in combination with the first device.

19 Claims, 1 Drawing Sheet

METHOD FOR THE DATA EXCHANGE BETWEEN NETWORK DEVICES

This application claims the benefit, under 35 U.S.C. §365 of International Application PCT/EP01/11747, filed Oct. 11, 2001, which was published in accordance with PCT Article 21(2) on May 2, 2002 in English and which claims the benefit of European patent application No. 00122864.2, filed Oct. 20, 2000.

The invention relates to a method for the data exchange between network devices, especially to the data exchange between two HAVi devices connected via IEEE1394 bus.

BACKGROUND

For controlling several AV devices within a network of home entertainment products the so-called HAVi (Home Audio Video Interoperability) standard has been developed. This standard specifies the control of television sets, video recorders, set top boxes and other devices, especially for the control of the exchange of digital audio and video streams. The devices are connected via the IEEE 1394 bus (i.LINK® or Fire-Wire®), which has enough capacity to simultaneously carry multiple digital audio and video streams.

Each device added to the HAVi network automatically installs its own application and interface software and is automatically registered by the system so that other devices know what it is capable of. So-called Application Programming Interfaces of the most common AV functions have been standardized. Furthermore, functions on a device within the HAVi networking system may be controlled from another device within the system.

HAVi defines two different ways of using User-Interfaces (UIs). Both solutions are working in principle in the same way: one device within the network (target) provide UI-elements or a kind of a complete UI to a display device (controller). The controller renders the UI-elements or executes the complete UI, respectively. The first mode is called Data Driven Interaction (DDI), the second one UI by havlets.

Figure 1:
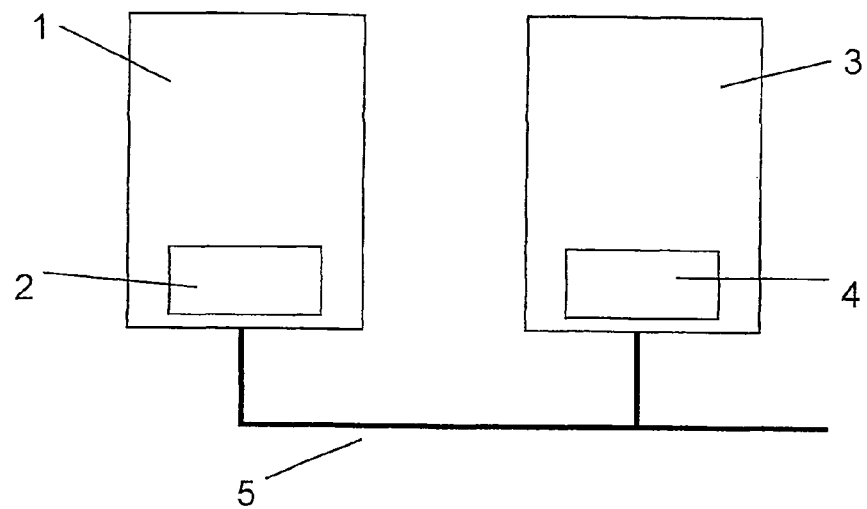

For a DDI-UI a part of a network is shown in FIG. 1. A display device 1 and a controlled device 3 are connected via an IEEE 1394 bus 5. The target device in the IEEE1394 network comprises a Device Control Module (DCM) 4, which can provide DDI-elements to the network for creating a UI. It is also able to control the device, natively, by commands.

Because a DCM is registered within the HAVi network, a DDI controller 2 can "subscribe" to the DCM 4. This is the start of an interaction between the DDI controller 2 and the DCM 4 to transmit the DDI-elements to the controller, display them to the user and afterwards to translate the user's action on these DDI-elements to native commands in the DCM.

INVENTION

It is one object of the invention to disclose a method for the data exchange between network devices which allows to simplify the simultaneous operation of two or more devices. This object is achieved by the method disclosed in claim 1.

The invention is based on the recognition of the following fact. The above described user interface is fine to control one device with its UI. However, the HAVi-standard shows a lack in setting up a service between two IEEE1394 devices, e.g. the copying of video-data from a camcorder to a VCR. This is because the user has to handle two UIs, on one he has to play the camcorder, on the other he has to set the VCR in record-mode.

In principle, according to the inventive method at least two devices are simultaneously operated with a single user interface, wherein the user interface of a first device is displayed as main user interface and the user interfaces of a second device is rendered within the main interface as reduced user interface which includes only operation elements necessary for operation of the second device in combination with the first device.

Advantageous additional embodiments of the inventive method are disclosed in the respective dependent claims.

DRAWING

Embodiments of the invention are described with reference to FIG. 1, which shows a network including a display device connected to a controlled device, and FIG. 2, which shows an user interface according to the inventive method.

EXEMPLARY EMBODIMENTS

Figure 2:
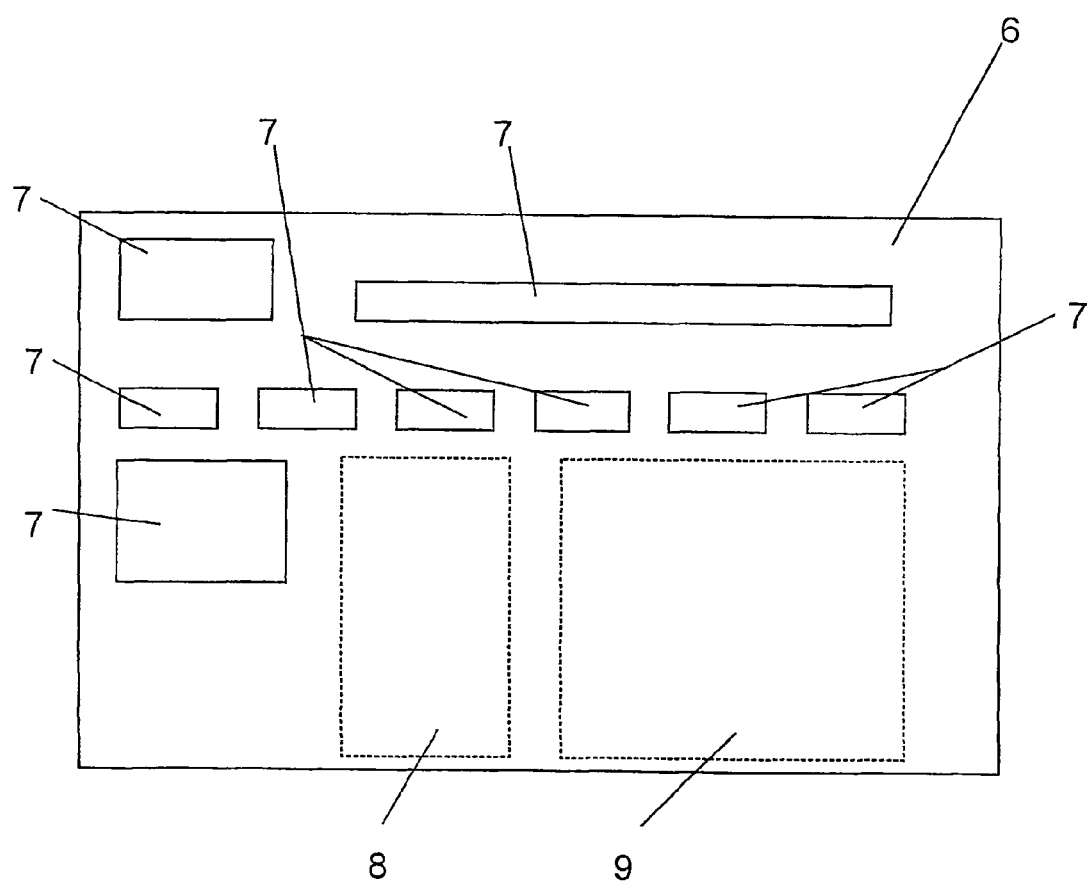

FIG. 2 shows an user interface according to the invention displayed by an display device. The user interface 6 comprises several DDI-elements 7 which are provided by the DCM of the DDI-target. Also shown as an element 8 is a list of source or sink devices which is provided by the DDI-controller device. In this context a source device means a device which is able to deliver a data stream and a sink device means a device able to receive a data stream. Also, a device can be a source and a sink device simultaneously, e.g. a VCR which can playback and record a data stream.

Furthermore, a reduced user interface 9 is displayed which is provided by an other DCM. This reduced user interface 9 is generated as follows, wherein as an example the control device is a television set and the selected device is a camcorder.

Initially, the user sitting in front of the television set selects the camcorder on the television screen, e.g. by clicking on an icon representing the camcorder. As a result the user is provided with the main panel for controlling the camcorder.

Due to a registry scan of the controller, the user is able to provide possible sink and source devices within the network for the camcorder. So the controller is also able to render a/two choice lists of sink/source devices within the camcorder user interface. Two separate lists can be displayed, wherein the first list comprises sink devices and the second list comprises source devices. Also a combined list can be displayed which comprises sink devices and source devices. The sink/source devices can be listed in text form or can be displayed by corresponding icons. The list(s) can also comprise further details of the sink/source devices. So the kind of data streams processable by the devices can be displayed, e.g. source device for MPEG 2 audio and video signals.

When selecting, for example, a digital VCR as a sink device from the list, the HAVi-stream-setup between the camcorder and the digital VCR will be done by the controller. In addition the sink device's DCM (VCR) will provide a reduced user interface, which is also rendered within the main (camcorder) user interface and comprises only the elements of the VCR which are necessary for operation as a sink device, e.g. "record", "play", "pause", "forward", "rewind".

To help the controller rendering it's own elements within the DDI-targets UI, the DDI-target provide placeholder-elements for the sink/source choice lists and the reduced UI and rendering attributes for these elements.

The interaction between the controller and the target starts in response to a subscribe command send from the controller to the target. The target memorizes the software element which sent this message and returns identification data (ID). The controller uses this ID as an argument for a command for obtaining the complete content of the DDI element for rendering on the display of the controller device. Contrary to the current HAVi specification the DDI-target must provide not only one RootPanelID for building the main UI, but it should provide 3 PanelIDs, one for each the MainRootPanel, the reduced SinkPanel and the reduced SourcePanel. These three PanelIDs can be specified independently. However, it is also possible to specify directly only the PanelID for the MainRootPanel and to specify further that the two following PanelIDs correspond to the reduced SinkPanel and reduced SourcePanel, respectively.

In addition, certain functions of the sink and source devices can be combined, e.g. the camcorder UI's 'play' button and the sink UI's 'record' button can be replaced by one 'copy to' button. This not only enhances the clarity of the displayed user interface but also simplifies the simultaneous operation of the devices. For this handling it is mandatory that a 'play' button of a general UI must have the attribute 'start source' and a 'record' button of a general UI must have the attribute 'start sink'. Further on, the attributes 'start source' and 'start sink' must not assigned to more the one DDI-element of the whole UI, each. Respectively, a "stop source" and "stop sink" for the "stop" button or a "pause source" and "pause sink" for the "pause" button can be used for a general UI.

The invention can be used for the simultaneous operation of two or more bus connected electronic devices, especially of two or more HAVi devices connected via IEEE1394 bus.

The invention claimed is:

1. Method, comprising the steps of:
receiving, by a control device, a user selection of a first device;
receiving, by the control device, description data stored in the first device;
generating, by the control device, a user interface for the selected device based on description data and displaying the user interface on a display of the control device with interface elements associated with a second device, wherein the first and second devices are simultaneously operated with a single user interface, wherein the user interface of the first device is displayed as main user interface and the user interface of the second device is rendered within the main interface as reduced user interface which includes only operation elements necessary for operation of the second device as a sink device in combination with the first device.

2. Method according to claim 1, further comprising the steps of: displaying a list of possible sink or source device associated with the first device; and receiving user selection of a sink device, wherein the second device corresponds to the user selected sink device.

3. Method according to claim 2, wherein the displaying a list comprising two separate lists, wherein a first list comprises sink devices and the second list comprises source devices.

4. Method according to claim 2, wherein the displayed list comprises a combined list comprising sink devices and source devices.

5. Method according to claim 1, wherein the displaying step comprises displaying an operation element of the first device and an operation element of the second device as a single integrated common operation element.

6. Method according to claim 5, wherein the operation element corresponds to an operation of recording of the data stream.

7. Method according to claim 6, wherein the operation element corresponds to a recording of the data stream in response to one "copy to" button.

8. Method according to claim 1, further comprising the step of receiving from devices connected to the control device elements for generating three different interface elements including a main user interface, a reduced sink user interface and a reduced source user interface.

9. Method according to claim 8, wherein the receiving step further comprises receiving identification data for panels of the user interface.

10. Method according to claim 9, wherein the receiving step comprises receiving a first identification data for the main user interface, a second identification data for the reduced sink user interface and a third identification data for the reduced source user interface are provided.

11. Method according to claim 9, wherein only a first identification data for the main user interface is provided by the selected device and wherein the reduced sink user interface and the reduced source user interface are specified by two dependent values, e.g. the two following values, of the first identification data.

12. An apparatus, comprising:
a bus interface for coupling the apparatus to a plurality of devices via a digital bus;
a controller generating a user interface display for enabling user control of first and second devices via said user interface display, the controller receiving description data associated with the first and second devices via said digital bus, wherein the user interface display comprises a main user interface associated with the first device and a second user interface display rendered within the main user interface as a reduced user interface, the second user interface display including only operation elements necessary for operation of the second device as a sink device in combination with the first device.

13. The apparatus according to claim 12, wherein the main user interface includes a list of possible sink or source devices within the network, and upon user selection of a second device from the main user interface, the controller generating the second user interface within the main interface, the second user interface being associated with the selected second device.

14. The apparatus according to claim 13, wherein the main user interface include two separate lists, a first list comprising sink devices and a second list comprising source devices.

15. The apparatus according to claim 13, wherein the main user interface includes a combined list that includes sink devices and source devices.

16. The apparatus according to claim 12, wherein the user interface display includes an operation element of the first device and an operation element of the second device integrated into a single common operation element.

17. The apparatus according to claim 16, wherein the single operation element comprises an operation element of the first device for playback of a data stream and an operation element of the second device for recording of the data stream.

18. The apparatus according to claim 17, wherein the user interface display includes a first button that initiates a recording process wherein the data stream between the first device and the second device is set up.

19. The apparatus according to claim 12, wherein a selected device provides elements for generation of three different user interfaces, including the main user interface, a reduced sink user interface and a reduced source user interface.

* * * * *